May 4, 1965 LIN KAO 3,182,123

NOISE PROTECTION CIRCUIT

Filed Oct. 30, 1961

INVENTOR.
Lin Kao
BY James T. Barr
ATTY.

3,182,123
Patented May 4, 1965

3,182,123

NOISE PROTECTION CIRCUIT

Lin Kao, Evanston, Ill., assignor to Admiral Corporation, Chicago, Ill., a corporation of Delaware Filed Oct. 30, 1961, Ser. No. 148,402
5 Claims. (Cl. 178—7.3)

Figure 1:
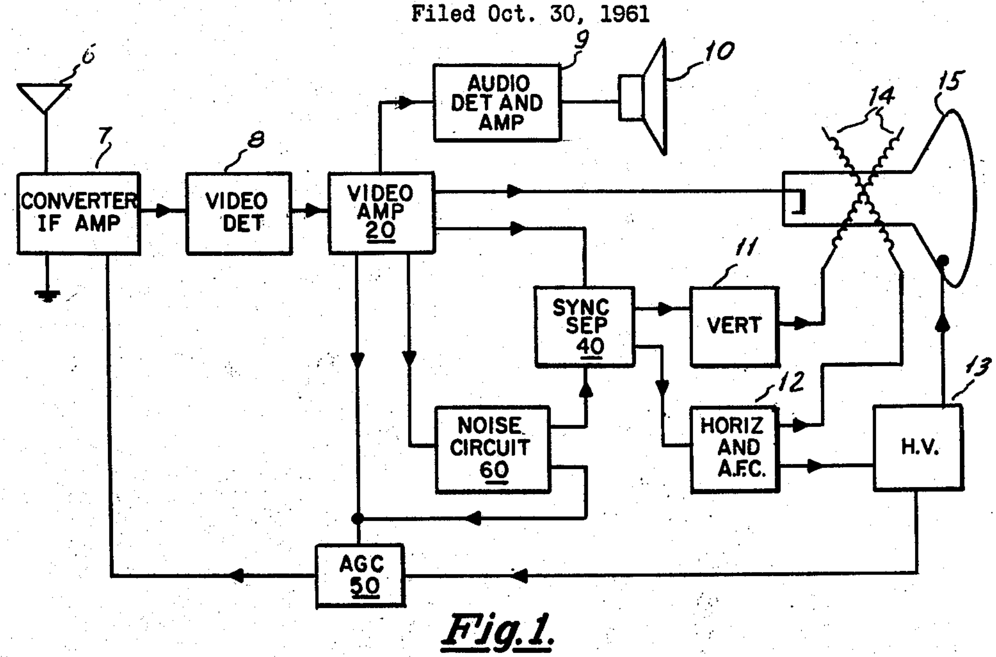

This invention relates in general to television receivers and in particular to circuitry therein for improving the visual display presented on the receiver screen, especially under adverse signal conditions. Standard television signals include video information components for reproducing a visual indication of the scene being televised, audio information components for reproducing the sound accompaniment, and synchronizing components for controlling operation of the raster producing means in the receiver. The video information components and synchronizing components of the television signal comprise amplitude modulations, whereas the audio components comprise frequency modulations. The synchronizing components are separated in amplitude from the video information components, being larger than any of the video information components, and have relatively constant amplitude levels. However, the transmitted television signal is subject to extraneous noises from many sources and often the noise components greatly exceed the magnitude of the synchronizing components.

These large noise components interfere with proper synchronization of the television sweep circuits and often result in picture "jitter," horizontal "tearing," vertical "rolling," etc. As is well known in the art, the vertical circuit is most susceptible to noise and consequently a television receiver with poor noise immunity may produce an abnormal amount of picture "rolling" which is very disturbing to the viewer.

The circuit of the invention utilizes a modified type of noise inversion. The principles of noise inversion are well known in the art and involve producing signals of opposite polarity to the large noise signals, and effecting a cancellation thereof by combining the noise signals and the produced signals. Most noise inverter circuits are however, highly critical, both in design and operation since the modern day television receiver must be able to accept a wide range of television signal levels. The most critical areas involve weak television signals, for these signal generally have the poorest signal to noise ratios. A major problem in noise inverter circuit design has been to achieve sufficient noise cancellation voltage without unduly loading the video detector or unduly reducing the amplitude of the synchronizing pulses.

The circut of the invention obviates this difficulty to a greater extent than other prior art noise inverter circuits by providing a high gain noise inverter tube having a load resistor which is independent of the remainder of the television circuitry. With this arrangement very large noise cancellation potentials may be achieved without degrading the sync pulses or loading the video detector. These large noise pulses are then recombined with the composite video signal to effectively overcancel the original noise pulses and give rise to pulses of opposite polarity which disable the synchronizing signal separator. Thus, in effect the circuit of the invention combines in a novel manner the principles of noise inversion and of noise gating.

Accordingly, a principal object of this invention is to provide an improved noise protection circuit for television receivers;

Another object of this invention is to provide an improved noise cancellation circuit;

Still another object of this invention is to provide a noise cancellation circuit employing a noise inverter tube in which the conduction level of the noise inverter tube is continuously adjusted in accordance with signal level changes;

A further object of this invention is to provide a noise cancellation circuit of high gain whereby substantially all noise impulses exceeding a predetermined level are overcancelled.

A still further object of this invention is to provide a noise inverter circuit, the gain of which may be selected without detriment to the operation of the video detector or video amplifier circuits.

Figure 2:
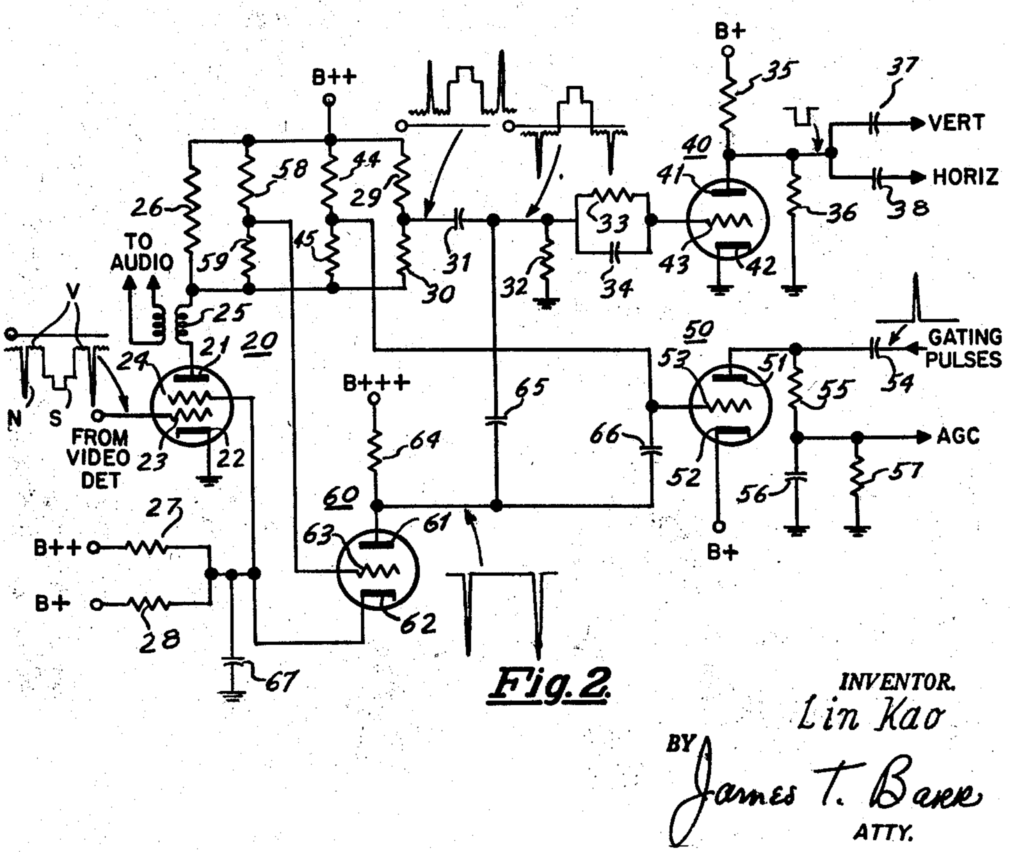

Other objects and advantages of this invention will become apparent upon a reading of the following specification in conjunction with the drawing in which FIG. 1 is a block diagram of a television receiver utilizing principles of the invention and FIG. 2 is a schematic diagram of a television receiver embodying the invention.

Referring now to FIG. 1, a television signal is received by antenna 6 and coupled to converter and IF amplifier 7 where, in a manner are well known in the art, the received signal is amplified, converted to an intermediate frequency signal and further amplified. The output of converter 7 is coupled to a video detector 8 which develops a composite video signal containing video information components, sync signal components, fortuitous noise components and audio information components.

Video detector 8 feeds video amplifier 20, which has numerous outputs. One output feeds audio detector and amplifier 9. Here the audio signal is recovered, amplified and fed to speaker 10 which reproduces the acoustical accompaniment of the televised scene. Another output is coupled to sync separator 40 which removes the synchronizing signal components from the composite video signal and couples them to vertical deflection circuit 11 and horizontal deflection circuit 12. These circuits control respective ones of deflection winding 14 on picture tube 15 and are responsible for developing the well known raster on the viewing screen of picture tube 15. Horizontal circuit 12 also feeds a high voltage network 13. This circuit develops the necessary high potential for operation of picture tube 15.

Another output of video amplifier 20 feeds the cathode of the picture tube 15. Further outputs of video amplifier 20 feed noise circuit 60 and automatic gain control circuit 50. Noise circuit 60 develops the noise cancellation pulses which are used to eliminate the noise pulses in the composite signal coupled to sync separator 40 and which may also be used to eliminate noise pulses in the signal fed to AGC circuit 50. The AGC circuit 50 performs its normal function of maintaining the signal level to video detector 8 substantially constant for a wide range of received television signal level variations.

In FIG. 2 there are shown at various points around the circuit pictorial representations of the waveforms present. It should be undersood that these representations are intended to facilitate an understanding of the circuit and do not necessarily depict exact replicas of the waveforms existing at these points.

A video amplifier tube 20 having an anode 21, a cathode 22, a control grid 23, and a screen grid 24 is shown. Cathode 22 is grounded, control grid 23 receives the composite video signal from video detector 8, and anode 21 is connected to a source of B++ through an audio take-off transformer 25 and a load resistor 26. Screen grid 24 is connected to a source B++ through a resistor 27 and to a source of B+ through a resistor 28. A bypass capacitor 67 couples the junction of screen grid 34 and cathode 62 to ground for bypassing the video frequency signals. The composite video signal coupled to grid 23 is negatively oriented and includes a sync pulse S, video information components V, and noise pulses N. The signal is amplified in tube 20 and appears across load resistor 26 as a positively oriented signal. A pair of resistors 29 and 30 are connected across load resistor 26. The junction of these resistors is coupled through a capacitor 31 to the input circuit of sync separator 40. This input circuit comprises resistor 32 and a parallelly connected resistor 33 and capacitor 34. This arrangement of elements is well known in the art and cooperates to allow only the components of the applied signal having magnitudes equal to or greater than the magnitude of the sync pulses to initiate conduction in sync separator 40.

Sync separator 40 is shown as a triode having an anode 41, a cathode 42, and a control grid 43. Anode 41 is connected to a source of B+ through a load resistor 35, cathode 42 is grounded and control grid 43 is connected to the input circuit previously described. The separated sync pulses are coupled by capacitors 37 and 38 to the vertical and horizontal circuits, respectively.

Video amplifier load resistor 26 is also bridged by another pair of resistors 44 and 45 whose junction is coupled to the input of AGC tube 50. AGC tube 50 is a triode having an anode 51, a cathode 52, and a control grid 53. Cathode 52 is connected to a source of B+ and anode 51 is coupled through a capacitor 54 to a source of gating pulses (not shown). These gating pulses are usually derived from the high voltage transformer in the receiver and occur at the horizontal line frequency or sync pulse rate. Thus, AGC tube 50 is cut off until the advent of a gating pulse at which time it is driven into conduction. The degree of conduction is determined by the signal appearing on control grid 53. An integrating network is coupled to anode 51 and comprises resistor 55, capacitor 56 and resistor 57. These elements are also well known in the art and are effective to develop a direct current negative potential which varies in accordance with signal level variations in the received television signal. The developed AGC voltage is coupled to the converter and IF amplifier to vary the gain thereof and maintain the signal level at the video detector substantially constant for all signals exceeding the AGC tube conduction threshold.

Noise inverter tube 60 comprises a triode having an anode 61, a cathode 62, and control grid 63. Anode 61 is connected through a large load resistor 64 to a source of potential B+++. Cathode 62 is connected to screen grid 24 in video amplifier 20 and control grid 63 is connected to the junction of a pair of resistors 58 and 59 which also bridge video amplifier load resistor 26. The output of noise inverter tube 60 is coupled via capacitors 65 and 66 to the inputs of sync separator 40 and AGC tube 50, respectively. It should be noted that a triode tube need not necessarily be used for noise inverter tube 60, this being merely a matter of choice.

In a representative television receiver the B+, B++, and B+++ potentials may be on the order of 140 volts, 270 volts, and 450 volts, respectively. In most modern day television receivers, a source of boost voltage (approximately 450 volts) is available and it is therefore desirable to connect the noise tube, through a large load resistor to this source of boost potential. This arrangement provides for a very high gain noise tube. However, it will be realized that this feature is not essential to the invention.

In operation, a composite video signal is fed to video amplifier tube 20 where it is amplified in a well known manner. This signal is coupled to sync separator tube 40 where the synchronizing pulses are separated from the video information components on the basis of magnitude. The amplified video signal is also fed to AGC tube 50 where an AGC voltage is developed, also in a conventional manner. It should be noted that the various combinations of resistors coupled across video amplifier load resistor 26 are utilized to allow impression of amplified video signals of different levels to the various circuits above mentioned. These resistors also isolate the video amplifier from the following circuits. The use of these resistors will be understood to be a matter of design and their inclusion herein should not be considered in any way a limitation of the invention.

The video amplifier screen grid 24 is coupled through resistors 27 and 28 to separate sources of B+ and B++ potential. The cathode of the noise inverter tube is directly connected to the video amplifier screen grid. This connection is necessary to effect adjustment of the conduction threshold of noise inverter tube 60 in accordance with the conduction current in video amplifier tube 20. During strong signal operation the average current in video amplifier tube 20 is small and consequently the screen grid current is also small. Thus, the potential existing at the screen grid is relatively high. In this case the cathode 62 of noise inverter tube 60 has a high positive potential applied thereto and noise inverter tube 60 requires a larger potential on its grid 63 to cause conduction therein. This arrangement precludes operation of noise inverter tube during the sync portions of the composite video signal under strong signal conditions. Under weak signal conditions the average conduction current in video amplifier tube 20 increases substantially with the result that screen grid 24 draws appreciably more current. The potential existing on screen grid 24 under these conditions is much lower than that which exists under strong signal conditions. Consequently, the cathode of noise inverter tube 60 is much less positive and hence, the signal requirements for driving noise inverter tube 60 into conduction are decreased. It is under weak signal conditions, especially, that the noise inverter tube is most needed because under these conditions the noise pulses in the composite video signal may greatly exceed the level of the sync pulses. Under strong signal conditions these noise pulses are limited in magnitude due to the cut off characteristics of the video amplifier tube.

By providing a high gain noise inverter tube the circuit of the invention assures the development of large noise cancellation pulses responsive to noise impulses which exceed the level of the sync pulses by a predetermined amount. These large cancellation pulses are then combined with the amplified composite video signal in phase opposition to the original noise pulses and effect an over-cancellation thereof. Thus, a form of gating is achieved in that the sync separator and the AGC tube are cut off during occurrence of these noise pulses and false operation in both these circuits is precluded. It should also be noted that with the circuit of the invention the limitations heretofore placed upon the gain of the noise inverter tube are removed since the noise inverter tube load resistor is independent of the remainder of the television circuitry. In prior art circuits, this load resistor is normally connected to a portion of the video amplifier load resistor which necessitates a compromise between the noise inverter tube gain and the synchronizing signal output desired from the video amplifier.

What has been described is a novel noise protection circuit for a television receiver which effectively precludes misoperation of the synchronizing signal separator under noise conditions. This circuit accomplishes the above result without sacrificing the synchronizing signal amplitude from the video amplifier. It will be understood by those skilled in the art that numerous modifications and departures from the circuit as described may be made without departing from the true spirit and scope of the invention as set forth in the appended claims.

What is claimed is:

1. In a television receiver including means for developing from a received television signal a composite video signal including video components, synchronizing signal components and fortuitous noise components, said synchronizing components being greater in magnitude than said video components and said fortuitous noise components often exceeding the magnitude of said synchronizing components; a video amplifier for amplifying said composite video signal; a load impedance for said video amplifier; means for separating said synchronizing components from said video components on the basis of amplitude; means coupling said load impedance to said separating means; said video amplifier including an electron tube having a screen electrode; a high gain noise inverter tube having an anode, a cathode and a control grid; means coupling said load impedance to said control grid; means coupling said screen electrode to said cathode to thereby establish the conduction threshold of said noise inverter tube at a point a predetermined amount in excess of the amplitude of said synchronizing components; a high direct current voltage source; a relatively large load resistor connected between said high voltage source and said anode; and means for coupling said load resistor to said separating means whereby during occurrence of a fortuitous noise component having an amplitude exceeding the amplitude of said synchronizing components by said predetermined amount, said noise inverter tube is driven conductive to develop a potential for overcancelling said last mentioned fortuitous noise component.

2. In combination in a television receiver including means for producing from a received television signal a composite video signal having video information components and synchronizing signal components, said synchronizing signal components being greater in magnitude than said video information components, said television signal being subject to fortuitous noise components of greater magnitude than said synchronizing signal components; a video amplifier tube and a load impedance therefor; means for applying said composite video signal to said video amplifier tube; a high gain noise inverter tube for developing pulses opposite in polarity to, and greater in magnitude than, said fortuitous noise components including a cathode, a control grid and an anode; means for applying to said cathode a potential varying as a function of the average, conduction current in said video amplifier tube; said last mentioned means automatically adjusting the conduction threshold of said noise inverter tube; means coupling at least a portion of the voltage developed across said load impedance to said control grid; a synchronizing signal separator for separating said synchronizing signal components from said video information components on the basis of magnitude; a first capacitor coupling said anode to the input of said synchronizing signal separator; a second capacitor coupling said load impedance to the input of said synchronizing signal separator; said noise inverter tube being held in a nonconductive state during occurrence of said synchronizing signal components and said video information components and being driven conductive only during occurrence of said fortuitous noise components whereby said noise inverter tube develops said pulses of opposite polarity which overcancel said fortuitous noise components at the input of said synchronizing signal separator.

3. In combination in a television receiver including means for producing from a received television signal a composite video signal having information components and reference components, said reference components being greater in magnitude than said information components, said television signal being subject to fortuitous noise components of greater magnitude than said reference components; a video amplifier tube having a screen electrode; a load impedance for said video amplifier tube; means for applying said composite signal to said video amplifier tube; a high transconductance noise inverter tube for developing pulses oppositely oriented with respect to, and greater in magnitude than, said fortuitous noise components including a cathode connected to said video amplifier screen electrode, a control grid coupled to said load impedance and an anode; means including a large load resistor coupling said anode to a source of high direct current potential; separating means for separating said reference components from said composite signal on the basis of magnitude; means capacitively coupling said anode to the input of said separating means; and means capacitively coupling said load impedance to the input of said separating means whereby, during occurrence of said fortuitous noise components, said noise inverter tube is driven conductive to produce said oppositely oriented pulses at its anode, which pulses are effective to overcancel said fortuitous noise components and disable said separating means.

4. In combination in a television receiver including means for producing a composite video signal having information components and periodic reference components from a received television signal, said reference components being greater in magnitude than said information components, said television signal being subject to fortuitous noise components having magnitudes often exceeding the magnitude of said reference components, and means for maintaining the level of said reference components substantially constant for all television signals of a first magnitude or greater; a video amplifier tube including a screen electrode; a load impedance for said video amplifier tube; means for applying said composite video signal to said video amplifier tube; a high gain noise inverter tube for developing oppositely oriented pulses as a function of said fortuitous noise components including a cathode connected to said screen electrode for automatically adjusting the conduction threshold of said noise inverter tube as a function of the average video amplifier current, a control grid coupled to said load impedance and an anode; means including a large resistor coupling said anode to a source of high direct current potential; separating means for separating said reference components from said information components on the basis of amplitude; means capacitively coupling said anode to the input of said separating means; and means capacitively coupling said load impedance to the input of said separating means; said oppositely oriented pulses overcancelling all fortuitous noise components which substantially exceed the level of said reference components, whereby said separating means is disabled during occurrence of said last mentioned noise components.

5. In combination in a television receiver: a video detector for developing a negatively oriented composite video signal from a received television signal, said composite video signal including periodic reference components, fortuitous noise components and video information components, said periodic reference components being greater in magnitude than said video information components, said fortuitous noise components having magnitudes often exceeding that of said periodic reference components; means for separating said periodic reference components from said video information components on the basis of amplitude; control means for varying the level of said received television signal to maintain the level of said composite video signal substantially constant, said control means developing a control potential as a function of the magnitude of said periodic reference components; a video amplifier tube for developing a positively oriented replica of said composite video signal; a noise tube having an anode voltage greater than the anode voltage of said video amplifier tube coupled to said video amplifier tube for developing negative polarity pulses responsive to said fortuitous noise pulses; means including a connection to the screen grid of said video amplifier tube for maintaining said noise tube disabled for all signals having magnitudes less than a predetermined amount above the magnitude of said reference components; and means for alternating current coupling the output of said noise tube means to the output of said video amplifier means whereby said fortuitous noise components having magnitudes exceeding said reference components by said predetermined amount are greatly overcancelled by said negative polarity pulses from said noise tube.

References Cited by the Examiner

UNITED STATES PATENTS

| | | | |
|---|---|---|---|
| 2,717,920 | 9/55 | Avins | 325—473 XR |
| 2,797,259 | 6/57 | Thomas | 178—7.3 |
| 2,803,700 | 8/57 | Kroger | 178—7.3 |
| 2,945,090 | 7/60 | Scott | 178—7.3 |

FOREIGN PATENTS

| | | |
|---|---|---|
| 1,229,816 | 3/60 | France. |

DAVID G. REDINBAUGH, *Primary Examiner.*

JOHN P. WILDMAN, *Examiner.*